United States Patent [19]

Kurabayashi et al.

[11] Patent Number: 5,255,764
[45] Date of Patent: Oct. 26, 1993

[54] ACTIVE/PASSIVE DAMPING APPARATUS

[75] Inventors: Hiroshi Kurabayashi; Toshio Omi; Hiroshi Miyano, all of Tokyo, Japan; Takafumi Fujita, 575-28, Nakanokuki, Nagareyama-shi, Chiba, Japan

[73] Assignees: Takafumi Fujita, Chiba; Mitsubishi Steel, Tokyo, both of Japan

[21] Appl. No.: 989,471

[22] Filed: Dec. 8, 1992

Related U.S. Application Data

[63] Continuation of Ser. No. 530,266, May 30, 1990, abandoned.

[30] Foreign Application Priority Data

Jun. 6, 1989 [JP] Japan ............... 1-142070

[51] Int. Cl.$^5$ ............... F16F 7/10; E04B 1/98
[52] U.S. Cl. ............... 188/380; 267/136; 52/1; 52/167 DF; 248/583
[58] Field of Search ............... 188/299, 378-380; 267/136, 140.5; 52/1 X, 167 DF X; 248/583 X, 605

[56] References Cited

U.S. PATENT DOCUMENTS

| | | | |
|---|---|---|---|
| 3,483,951 | 12/1969 | Bonesho et al. | 188/379 |
| 3,552,271 | 1/1971 | Suggs et al. | 267/136 X |
| 3,701,499 | 10/1972 | Schubert et al. | 248/550 X |
| 3,735,952 | 5/1973 | Platus et al. | 267/136 X |
| 4,402,483 | 9/1983 | Kurabayashi et al. | 52/167 R X |
| 4,565,039 | 1/1986 | Oguro et al. | 267/140.5 X |
| 4,596,373 | 6/1986 | Omi et al. | 248/562 |
| 4,799,339 | 1/1989 | Kobori et al. | 52/167 DF X |
| 4,821,849 | 4/1989 | Miller | 188/285 X |
| 4,917,211 | 4/1990 | Yamada et al. | 248/636 X |
| 4,921,080 | 5/1990 | Lin | 188/299 |
| 4,973,854 | 11/1990 | Hummel | 188/299 X |
| 4,976,415 | 12/1990 | Murai et al. | 188/378 X |
| 5,025,599 | 6/1991 | Ishii et al. | 52/1 X |
| 5,067,684 | 11/1991 | Garnjost | 248/636 X |

Primary Examiner—Robert J. Oberleitner
Assistant Examiner—Josie A. Ballato
Attorney, Agent, or Firm—Amster, Rothstein & Ebenstein

[57] ABSTRACT

A damping apparatus for large structures operable both passively and actively is disclosed which comprises a passive type damping mechanism to be mounted on the structure and including an added mass, spring, dampener, etc., hydraulic cylinders mounted on the structure and connected to the added mass, an electro-hydraulic servo mechanism to switch the hydraulic cylinders between passive and active type operation, and a control unit for switching the electro-hydraulic servo mechanism between passive and active type operation in response to the velocity and displacement of the added mass as well as the velocity of the structure.

4 Claims, 5 Drawing Sheets

ACTIVE OPERATION

PASSIVE OPERATION

ACTIVE/PASSIVE DAMPING APPARATUS

This is a continuation of copending application(s) Ser. No. 07/530,266 filed on May 30, 1990, now abandoned.

BACKGROUND OF THE INVENTION

The present invention relates to a damping apparatus, and more particularly to a damping apparatus suitable for mounting on various structures such as high rise buildings, bridges, steel towers, chimneys, etc. to damp vibrations generated from external disturbances such as earthquakes, wind, etc.

Hitherto, two types of damping apparatus for structures have been wellknown, i.e. active types and passive types. The following is a brief explanation of the characteristics of these two types:

1) Passive Types

As represented by conventional dynamic dampers, in this type of apparatus passive damping elements are mounted to the structures to be damped so that the passive damping elements absorb the vibrational energies of the structures, damping the vibrations therein.

2) Active Types

In this type, vibrational energies are positively supplied to the structures externally so that the vibration of the structures are positively damped.

However, these two types have inherent problems, respectively, as explained below:

1) Passive Types a. Since there is friction in the support members, etc. for any added mass the added mass will not respond to small external disturbances. Therefore, no damping effects can be expected.

b. Even if the added mass vibrates in response to large external disturbances there are limitations to its damping effects.

2) Active Types a. In the case of damping devices for buildings, the added mass may be as large as several tens of tons to several hundred tons, and it requires a displacement of around ±1 m.

b. In cases where the total displacement is to be actively obtained by a hydraulic system, the system would become too large, making its practical use impossible.

c. When the capacity of the hydraulic system is insufficient, in the case of large external disturbances the displacement of the added mass is restricted, resulting in an inferior damping effect compared with passive types. (At present, added masses on the order of several tens of kgs to several tons are in practical use or under research.)

d. During power outages such types will not operate.

SUMMARY OF THE INVENTION

Therefore, it is a principal object of the present invention to provide a damping apparatus which can solve such problems inherent to the two types.

It is another object of the present invention to provide a damping apparatus which is automatically operable as an active type or a passive type in accordance with the magnitude or nature of vibration.

In accordance with the present invention a damping apparatus is provided wherein a passive type damping device including an added mass, spring means, damping means, etc., is combined with an electro-hydraulic servo mechanism which is capable of switching from a passive type to an active type or vice versa.

In one of the preferred aspects of the present invention the added mass is selected to be several ten of tons to several hundred tons and is made to be actively operated to damp the vibrations with a relatively small hydraulic system, while it is made to be passively operated by switching off the hydraulic system so that it permits the free movement of the piston rod of the hydraulic cylinder connected to the added mass.

Thus, in the damping apparatus in accordance with the present invention, when the external disturbances are small, the electro-hydraulic servo mechanism is actuated so that the hydraulic cylinder connected to the added mass is actively operated, revealing a larger damping effect than a passive type, but, when the external disturbances become so large that they exceed the capacity of the hydraulic cylinder, actuated so that the hydraulic cylinder operates passively, whereby the actuation of the electro-hydraulic servo mechanism is under the control of a computer means which responds to the vibration.

BRIEF DESCRIPTION OF THE DRAWINGS

These and other objects as well as advantages of the present invention will become more readily apparent upon reading the following specification and upon reference to the accompanying drawings, in which.

DESCRIPTION OF THE PREFERRED EMBODIMENT

Figure 1:
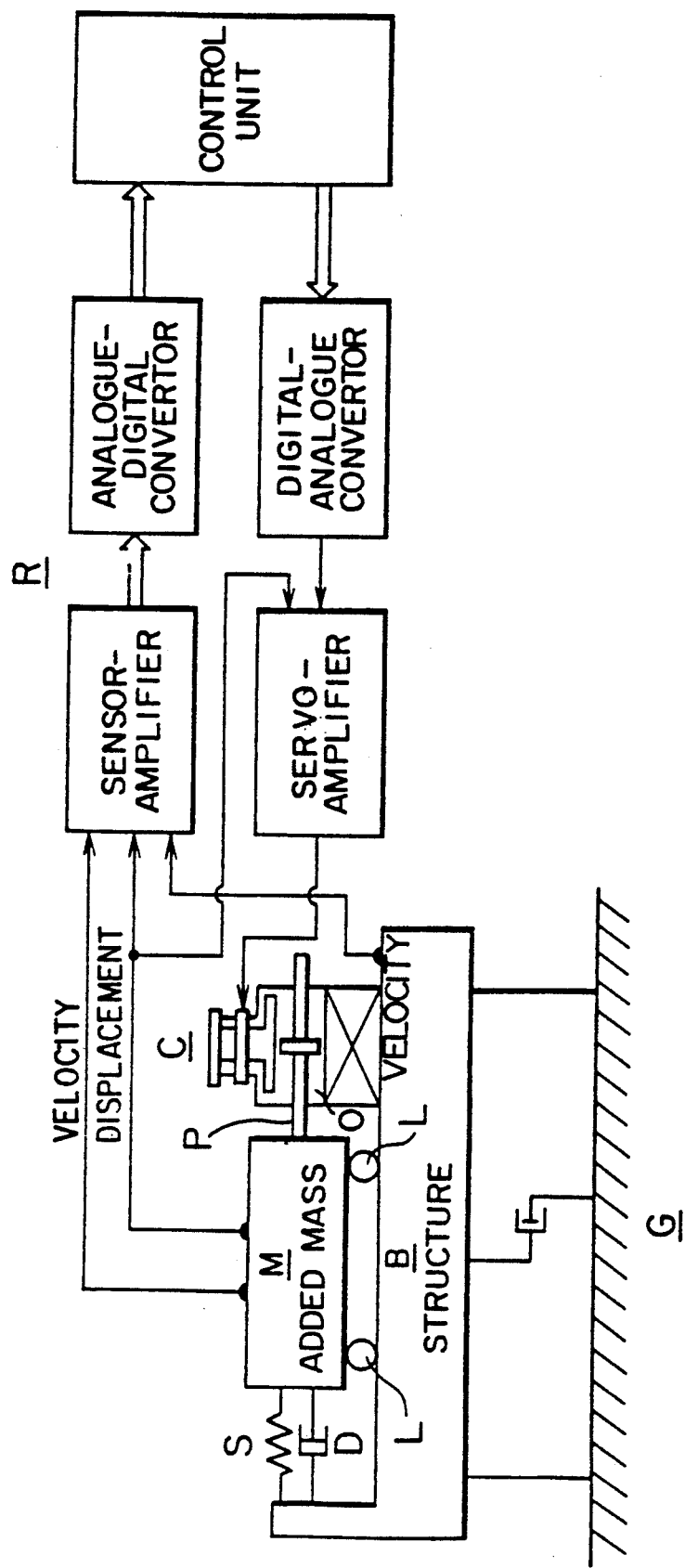
FIG. 1 is a diagrammatical view indicating the overall arrangement of one embodiment of the present invention.

Now referring to FIG. 1 wherein an overall arrangement of the present invention is diagrammatically represented, a structure or construction B that is to be damped is set on the ground G, a linear movement mechanism L adapted to move linearly in one direction being mounted on the structure B with an added mass M being put thereon. Arranged in parallel between the structure B and the added mass M are a spring means S and a damping means D such as an oil damper, a viscous damper, etc. in order to cause the added mass M to resonate together with the structure B. Further, the structure B has a hydraulic cylinder O fixedly arranged in the moving direction of the linear movement mechanism L with the piston rod P of the cylinder O being connected to the added mass M, with an electro-hydraulic servo mechanism C also mounted on the construction B in order to switch the operation of the hydraulic cylinder O from an active type to a passive type or vice versa. Moreover, in order to control the electro-hydraulic servo mechanism C a switching control mechanism R for switching the operation of the electro-hydraulic servo mechanism C between an active type and a passive type is associated therewith. The switching control mechanism R comprises a sensor-amplifier to receive electrical signals corresponding to the velocities and displacements of the construction B and the added mass M, a differentiator, an analogue-digital convertor A/D to convert the analogue signals to digital signals, a control unit (computer) CU to process the signals, a digital-analogue convertor D/A to convert the analogue signals from the control unit CU to digital signals, and a servo-amplifier SA to compare the analogue signals with the displacement signal from the added mass M, whereby the switching control mechanism R acts to supply the signals from the servo-amplifier SA to the electro-hydraulic servo mechanism C so that it is switched to operate in an active or passive mode.

Although, in the embodiment described above, the linear movement mechanism L is assumed to move to and fro in only one direction, i.e. in the plane of the drawing, in an actual system, another movement mechanism adapted to move orthogonally to the former, e.g. in the direction perpendicular to the plane of the drawing is arranged on the linear movement mechanism L, with the added mass M being mounted thereon instead of being mounted on the former.

Figure 2:
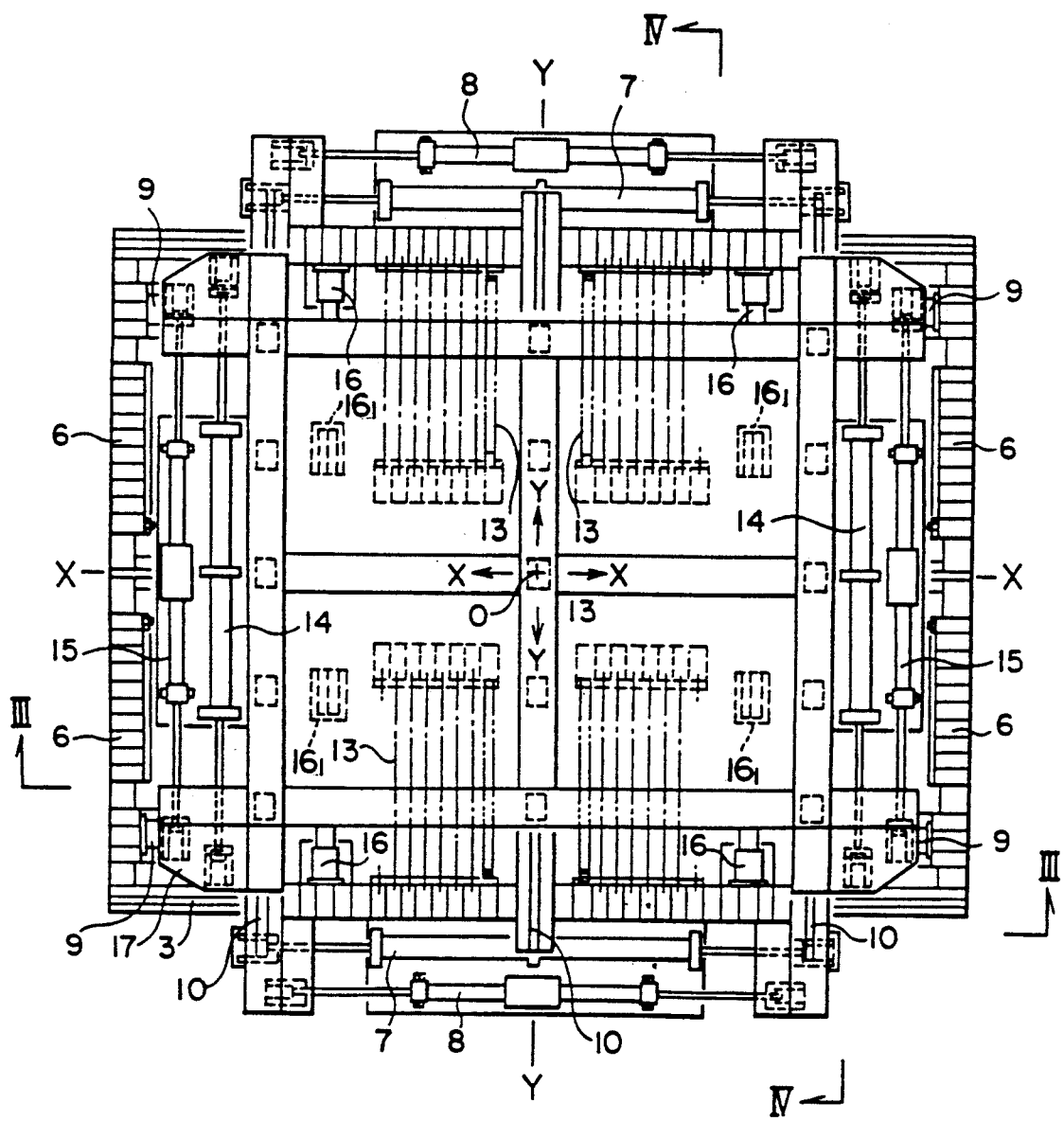
FIG. 2 is a plan view of one embodiment of the present invention.
Figure 3:
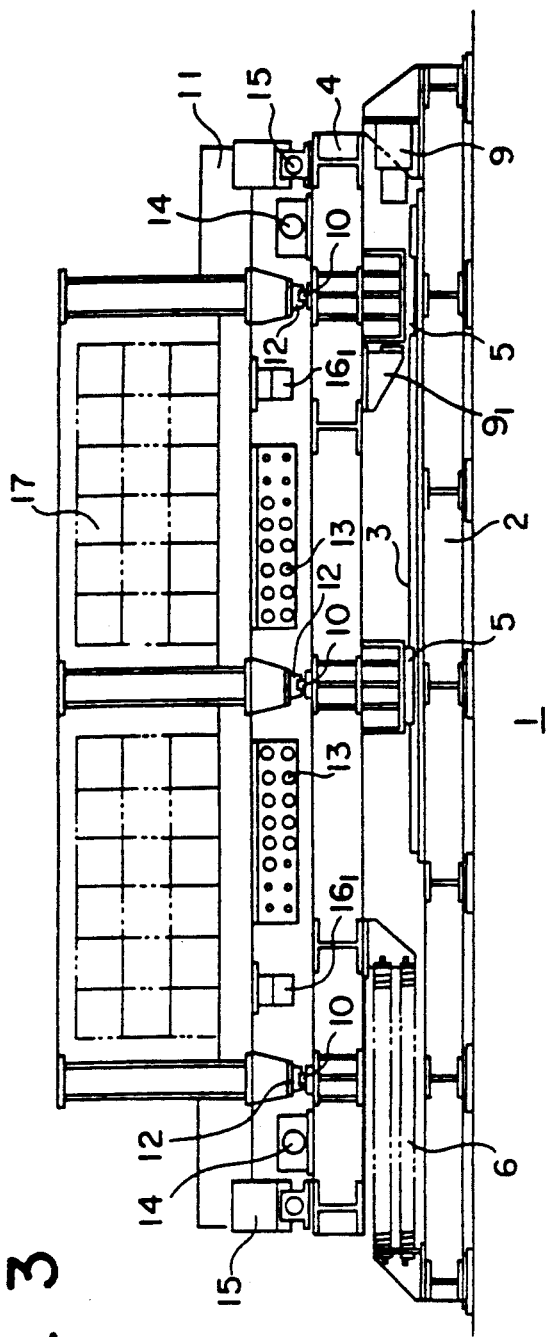
FIG. 3 is a cross sectional view taken along the lines III—III in FIG. 2.
Figure 4:
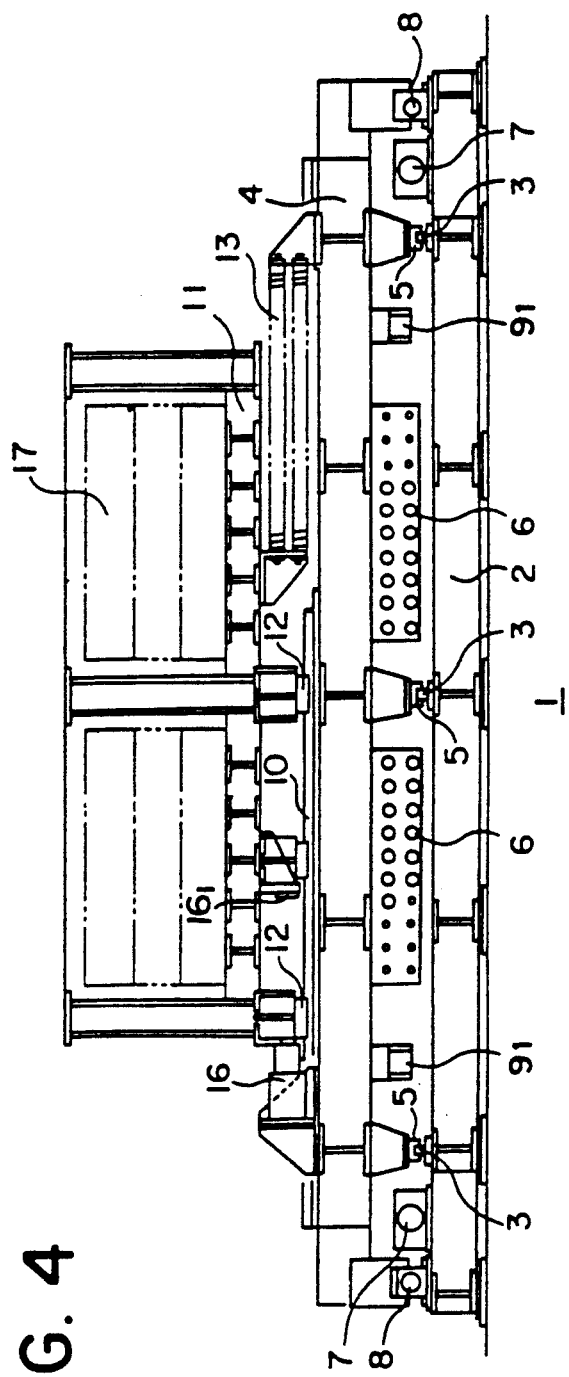
FIG. 4 is a cross sectional view taken along the lines IV—IV in FIG. 2.

That is, in FIGS. 2, 3 and 4 an embodiment of the present invention is shown in which two kinds of rectilinear movement mechanisms are provided so that they are movable in two orthogonal directions, i.e. in the X- and Y-directions.

As shown in these drawings, in this embodiment, mounted on the floor 1 of a structure which is to have its vibration damped is a hollow box-like base frame 2 of a rectangular configuration when viewed from above, having respective sides in the X- and Y-directions and having substantial height, with a number of X-direction rails 3 horizontally arranged on its upper surface in symmetry with the center line X—X of the base frame 2 in the X-direction. Another hollow box-like intermediate frame 4 of a rectangular configuration when viewed from above, having substantial height similar to the base frame 2 is laid on the X-direction rails 3 through a number of X-direction bearing members 5 so as to be freely shiftable relative to the base frame 2 with a space being left between the upper surface of the base frame 2 and the under surface of the intermediate frame 4.

Within the space formed between the upper surface of the base frame 2 and the under surface of the intermediate frame 4 four sets of X-direction springs 6 are disposed in symmetry with the center 0 of the base frame 2 and in parallel with the X-direction in a tensionless state with the respective ends of the springs 6 being fixedly secured to the respective brackets secured to the frames 2, 4, respectively. Similarly, between the base frame 2 and the intermediate frame 4 two sets of X-direction oil dampers 7 are arranged near the opposite side walls of the base frame 2, respectively, in the X-direction and in parallel with the X-direction springs 6. Further, between the base frame 2 and the intermediate frame 4 two sets of X-direction hydraulic cylinders 8 are arranged outside the X-direction oil dampers 7, respectively, and in parallel therewith, respectively. Additionally, on the upper surface of the base frame 2 four X-direction stoppers 9 are secured in symmetry with the center 0 thereof and secured in the X-direction. These X-direction stoppers 9 are adapted to be respectively associated with stopper members 9, correspondingly secured to the under surface of the intermediate frame 4 so as to restrict the relative X-direction movement between the base frame 2 and the intermediate frame 4.

Provided on the upper surface of the intermediate frame 4 are three Y-direction rails 10 elongating in the Y-direction, one passing through the center 0 of the intermediate frame 4 and two in symmetry therewith in the Y-direction, and on these Y-direction rails 10 is mounted a hollow box-like added mass carriage 11 for mounting thereon an added mass 17, the added mass carriage 11 having a bottom of a rectangular configuration when viewed in a plan view and adapted to be shiftable in the Y-direction with several sets of Y-direction bearing members 12 secured to the under surface of the bottom, the Y-direction bearing members 12 being laid on the Y-direction rails 10.

Within the space formed between the upper surface of the intermediate frame 4 and the under surface of the added mass carriage 11 four sets of Y-direction springs 13 are arranged in the Y-direction and in symmetry with the center 0 of the intermediate frame 4 with the respective ends of the Y-direction springs 13 being respectively connected to the brackets secured to the intermediate frame 4 and the added mass carriage 11, respectively. Two sets of Y-direction oil dampers 14 are provided between the intermediate frame 4 and the added mass carriage 11 in the Y-direction each near the opposite Y-direction side walls of the intermediate frame 4, respectively. Also, two sets of Y-direction hydraulic cylinders 15 are respectively provided between two frames 4 and 11, each arranged outside the oil dampers 14, respectively. Further, on the upper surface of the intermediate frame 4 Y-direction stoppers 16 are secured in the Y-direction, each being near a respective corner thereof, each of the Y-direction stoppers 16 being in association with stopper members 161, respectively, correspondingly provided on the under surface of the bottom of the added mass carriage 11, so as to restrict the relative movement between the intermediate frame 4 and the added mass carriage 11 in the Y-direction.

Thus, since the damping apparatus in accordance with the present invention is so constituted that the base frame 2 is mounted on the construction floor 1, the intermediate frame 4 being mounted on the base frame 2 so as to be shiftable in the X-direction with the X-direction bearing members 5 provided on the under surface of the intermediate frame 4 being laid on the X-direction rails 3 provided on the upper surface of the base frame 2, and the added mass carriage 11 is shiftably mounted on the intermediate frame 4 with the Y-direction bearing members 12 being laid on the Y-direction rails 10 and the added mass carriage 11 having the added mass 17 put thereon. The added mass 17 is made to be shiftable in the X- and Y-directions, and at the time of shifting of the added mass carriage 11 in the X- or Y-direction the X- or Y-direction springs 6 and 13 are stressed, respectively, the intermediate frame 4 and the added mass carriage 11 are oscillated in the X- or Y-direction, and the oscillation is damped by the X-direction oil dampers 7 or Y-direction oil dampers 14 accordingly.

Further, following the X- or Y-direction oscillation the X- or Y-direction hydraulic cylinders 8 or 15 are oscillated relative to their pistons accordingly. In this case, these hydraulic cylinders 8 or 15 may be switched to be operated actively or passively by the action of the electro-hydraulic servo mechanism C (see FIG. 1).

Figure 5:
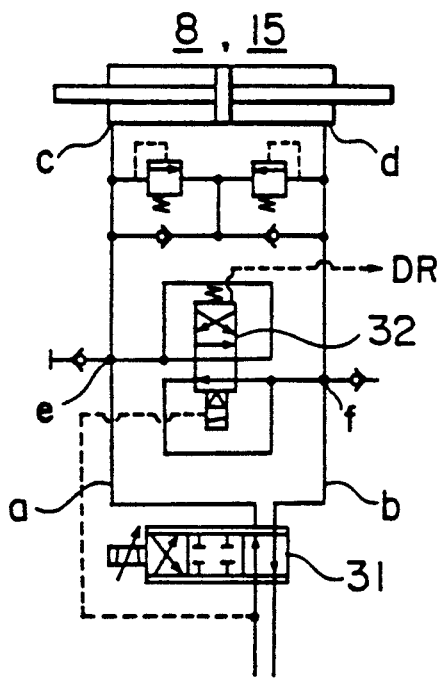
FIGS. 5 and 6 are diagrammatical views showing one example of the hydraulic system to switch the hydraulic cylinder in the embodiment shown in FIG. 2 to an active type and a passive type, respectively.
Figure 6:
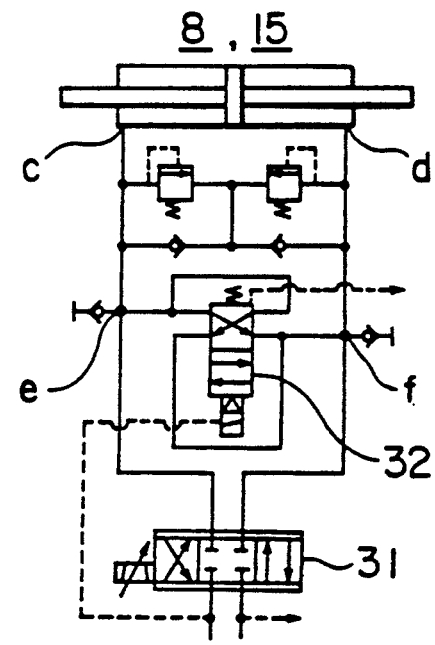

That is, FIGS. 5 and 6 show the hydraulic circuit of the electro-hydraulic servo system C in the state of operating the hydraulic cylinders 8 or 15 actively and passively, respectively.

The hydraulic circuit principally comprises an electromagnetic servo valve 31 for supplying hydraulic pressure to (or from) the hydraulic cylinders 8 or 15 from (or to) a hydraulic fluid source (not shown), and an electromagnetic valve 32, both valves 31 and 32 controlling the supply (or discharge) of the hydraulic fluid to (or from) the hydraulic cylinders 8 or 15. The active/passive operation switching control system DR controls the actuation of the electromagnetic servo valve 31 by receiving input signals corresponding to the velocity of the structure 1 as well as the velocity and displacement of the added mass 17 respectively detected by any known sensors, processing those input signals through its electrical components and providing the resultant output signals to the electro-hydraulic servo mechanism C.

The states of the hydraulic circuit of the electro-hydraulic servo mechanism C and the hydraulic cylinders 8 or 15 in the passive and active operation conditions are indicated in FIGS. 5 and 6, respectively.

The following is an explanation of both conditions of the hydraulic circuits of the electro-hydraulic servo mechanism C and the hydraulic cylinders 8 or 15:

1) Active Operation Condition (FIG. 5)

In this state of the operation the pressurized hydraulic fluid flows from its source (not shown) to the hydraulic cylinders 8 or 15 through the electromagnetic valve 31 via the passages a to c, and flows back to the pressurized hydraulic fluid source via the passages d to b. Thus, the damping apparatus shown in FIGS. 1 to 4 operates as an active type.

2) Passive Operation Condition (FIG. 6)

In this state of the operation the pressurized hydraulic fluid from its source is shut off by the electromagnetic valve 31. Thus, both cylinder chambers of the hydraulic cylinders 8 or 15 form a bypass circuit by the switching of the electrically operating valve 32 through the passages d→f→e→c. Therefore, the pistons of the hydraulic cylinders 8 and 15 can move freely (in the sense that there is no pressurized fluid resistance to overcome) in both directions, not obstructing the free shifting of the added mass 17 connected to the piston rods so that the added mass 17 is able to freely move in both the X-and Y-directions, the damping apparatus then operating as a passive type.

Following is an explanation of the results of the experiments carried out to confirm the effectiveness of the present invention.

RESULTS OF EXPERIMENTS

The damping apparatus in accordance with the present invention has a constitution as described above, i.e. it has such a constitution that the vibration damping mechanism comprising an added mass M, springs S, and damping elements D is combined with an electro-hydraulic servo mechanism C and the hydraulic cylinders 8 and 15 which can be selectively operated as an active type or a passive type.

The results of the experiments carried out on one of the embodiments of the damping apparatus in accordance with the present invention will be explained below. In reality the experiments were carried out by means of a computer assuming that the apparatus was mounted on a structure, one of the calculated results being given in FIG. 7.

Figure 7A:
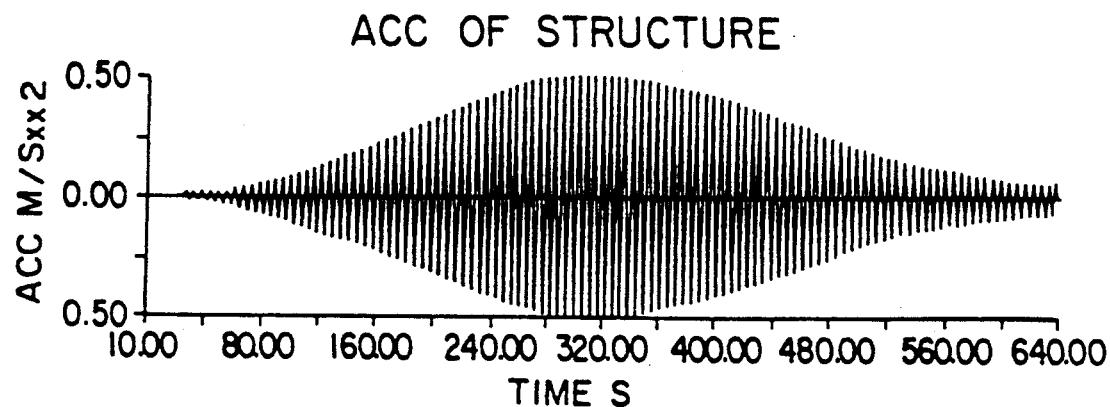
FIGS. 7a-7c contain diagrams showing an example of the results of the experiments carried out on the present invention.
Figure 7B:
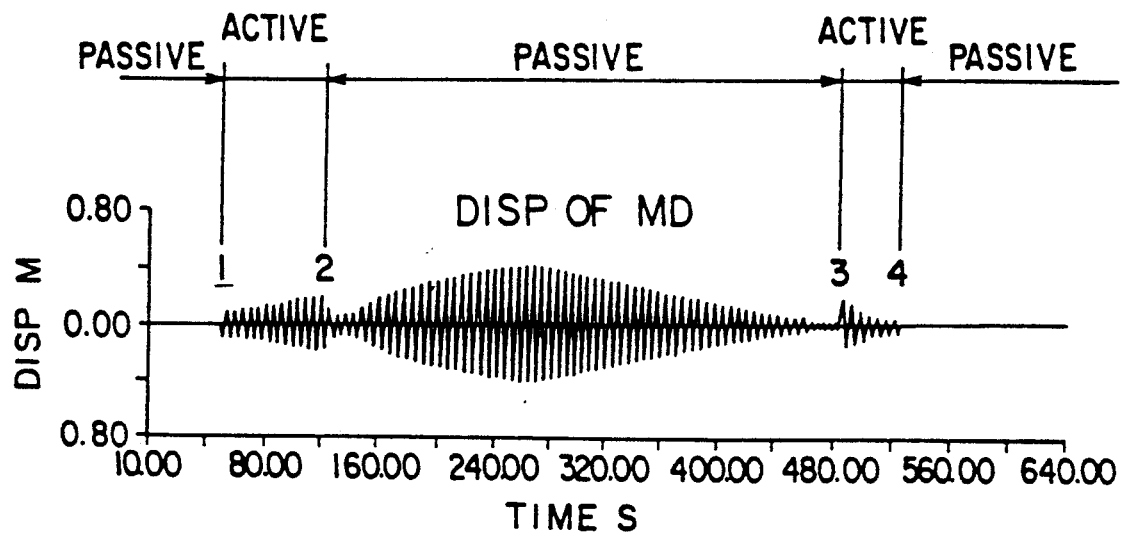
Figure 7C:
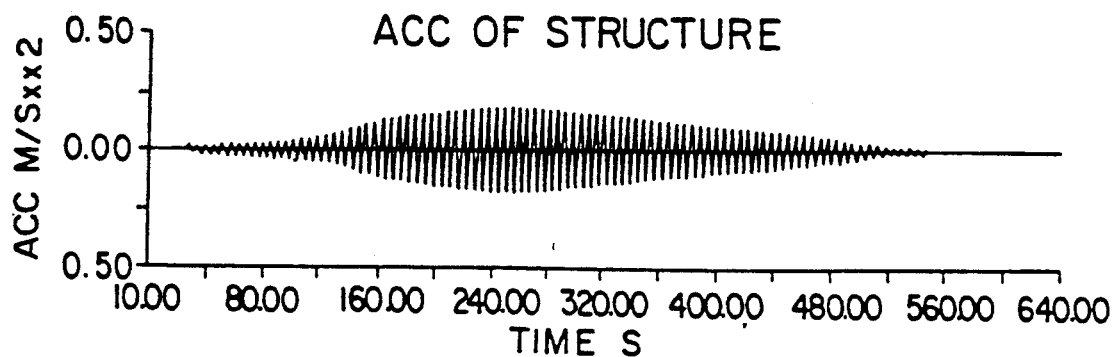

The diagrams in FIG. 7 have time (s) as the abscissa and the displacement (m) or acceleration (m/s$^2$) as the ordinate, whereby FIG. 7(a) represents the vibration characteristics of the structure without the damping apparatus, FIG. 7(b) represents the displacement of the structure when is set on the apparatus operating actively and passively in sequence, and FIG. 7(c) represents the acceleration of the structure when its vibration is damped by the apparatus having the characteristics as shown in FIG. 7(b).

In FIG. 7(b) the respective notations entered therein indicate the following, respectively:

[1] denoted the time when the acceleration to which the structure is subjected exceeded a predetermined value so that the apparatus is switched from a passive operation condition to an active operation condition;

[2] denoted the time when the nominal electrical current exceeded (the capacity of the hydraulic cylinders was exceeded) so that the apparatus was switched from the active operation condition to a passive operation condition;

[3] denoted the time when the acceleration decreased to a predetermined value so that the apparatus was switched from the passive operation condition to an active operation condition; and

[4] denoted the time when the acceleration further decreased below a predetermined value so that the apparatus was switched from the active operation condition to a passive operation condition.

By comparing FIG. 7(a) with FIG. 7(c) it will be appreciated that the damping apparatus in accordance with the present invention reveals superior effects in damping vibrations due to its ability to automatically and suitably switch from an active operation condition to a passive operation condition or vice versa.

From the foregoing it will be also appreciated that the damping apparatus of the present invention exhibits in essence the following effects:

a) A damping apparatus having an added mass of the order of several ten tons to several hundred tons can be realized with a hydraulic system having relatively small capacity;

b) Since at the time of small external disturbances it can operate as an active type larger damping effects can be expected than from a passive type;

c) Since at the time of large external disturbances it can be switched from an active type to a passive type the running costs can be reduced; and d) At the time of a power outage it can be automatically switched from an active type to a passive type, assuring that the apparatus reveals characteristics of a passive type as well; etc.

While the invention has been shown and described in its preferred embodiment, it will be clear to those skilled in the art that changes and modifications can be made thereto without departing from the scope of the invention.

What is claimed is:

1. An active/passive damping apparatus suitable for mounting on large structures to damp vibrations generated by external disturbances, said apparatus comprising a damping mechanism including an added mass, spring means, damping means, hydraulic cylinders mounted to a structure and connected to said added mass, an electro-hydraulic servo mechanism to switch the mode of operation of said hydraulic cylinders between passive and active modes of operation, and a control unit for switching said electro-hydraulic servo mechanism between the passive and active modes of operation on a real time basis so as to respond on a timely basis with the most suitable mode of operation for a large structure for a particular type and phase of vibrations, whereby said damping mechanism is controlled to be operated in one of the passive and active modes of operation through said electro-hydraulic servo mechanism under the control of said control unit.

2. An active/passive damping apparatus as claimed in claim 1, wherein said damping mechanism comprises a base frame to be mounted on the structure, an intermediate frame mounted on said base frame so as to be freely movable horizontally in an X-axis direction, an added mass carriage mounted on said intermediate frame so as to be freely movable horizontally in a Y-axis direction perpendicular to the X-axis direction and adapted to carry an added mass thereon, whereby X-axis direction spring means, X-axis direction damping means and X-axis direction hydraulic cylinders are arranged between said base frame and said intermediate frame, Y-axis direction spring means, Y-axis direction damping means and Y-axis direction hydraulic cylinders are arranged between said intermediate frame and said added mass carriage, and said X-axis direction hydraulic cylinders and said Y-axis direction hydraulic cylinders are adapted to be controlled by said electro-hydraulic servo mechanism.

3. An active/passive damping apparatus as claimed in claim 1, wherein said control unit for switching said electro-hydraulic servo mechanism between passive and active type operations includes a control means to process input signals representing velocity of the structure as well as the velocity and displacement of added mass so as to transform the input signals into an output signal, said electro-hydraulic servo mechanism comprising an electromagnetic valve means and an electrically operating valve, and controlled by said output signal from said control unit alternatively to bypass said hydraulic cylinders and to supply them with a pressurized hydraulic fluid from a pressurized hydraulic fluid source.

4. An active/passive damping apparatus suitable for mounting on large structures to damp vibrations generated by external disturbances, said apparatus comprising damping mechanism including an added mass, spring means, damping means, hydraulic cylinders mounted to a structure and connected to said added mass, an electro-hydraulic servo mechanism to switch the mode of operation of said hydraulic cylinders between passive and active modes of operation, and a control unit for switching said electro-hydraulic servo mechanism between the passive and active modes of operation on a real time basis so as to respond on a timely basis with the most suitable mode of operation for a large structure for a particular type and phase of vibrations, whereby said damping mechanism is controlled to be operated in one of the passive and active modes of operation through said electro-hydraulic servo mechanism under the control of said control unit;

said damping mechanism including additionally a base frame to be mounted on a structure, an intermediate frame mounted on said base frame so as to be freely movable horizontally in an X-axis direction, an added mass carriage carrying said added mass and mounted on said intermediate frame so as to be freely movable horizontally in a Y-axis direction perpendicular to the X-axis direction and adapted to carry an added mass thereon, whereby X-axis direction spring means, X-axis direction damping means and X-axis direction hydraulic cylinder are arranged between said base frame and said intermediate frame, Y-axis direction spring means, Y-axis direction damping means and Y-axis direction hydraulic cylinders are arranged between said intermediate frame and said added mass carriage, and said X-axis direction hydraulic cylinders and said Y-axis direction hydraulic cylinders are adapted to be controlled by said electro-hydraulic servo mechanism;

said control unit including a control means to process input signals representing velocity of said structures as well as the velocity and displacement of said added mass so as to transform the input signals into an output signal; and said electro-hydraulic servo mechanism including an electromagnetic valve means and an electrically operating valve, and being controlled by said output signal from said control unit alternatively to bypass said hydraulic cylinders and to supply them with a pressurized hydraulic fluid from a pressurized hydraulic fluid source.

* * * * *